March 15, 1955  C. J. SIDLER, JR  2,704,227
SELF-DUMPING CART

Filed July 17, 1952  2 Sheets-Sheet 1

Inventor
CLEMENT J. SIDLER, JR

By Howard J. Whelan.
Attorney

March 15, 1955  C. J. SIDLER, JR  2,704,227
SELF-DUMPING CART

Filed July 17, 1952  2 Sheets-Sheet 2

Inventor
CLEMENT J. SIDLER, JR.

By Howard J. Whelan.
Attorney

United States Patent Office 2,704,227
Patented Mar. 15, 1955

2,704,227

SELF-DUMPING CART

Clement J. Sidler, Jr., Baltimore, Md.

Application July 17, 1952, Serial No. 299,420

3 Claims. (Cl. 298—19)

This invention relates to self-dumping apparatus such as carts and the like and more particularly those used for transportation of soil, coal or materials of similar nature.

Practically all the dumping apparatus available at the present time require considerable man power to dump the load when it reaches its destination. To overcome this objection this invetnion has among its objects to provide a new and improved dumping apparatus wherein the weight of the load will be used to lift the body and dump the load from the apparatus.

An additional object of this invention is to provide a new and improved highly efficient dumping apparatus capable of carrying a large load and adapted for quickly and readily dumping the same; to permit a clean dump and avoid the retention of the transported material in or on any patr of the apparatus; to permit the operator of the apparatus to easily restore the apparatus to its normal condition after the load has been discharged; to adapt the apparatus to be easily maneuverable over uneven ground, and to provide certain novel and improved details serving to increase the efficiency and serviceability of this dumping apparatus.

Other objects will become apparent as the invention is more fully set forth.

For an understanding of the invention and the objects thereof, reference is made to the accompanying drawings, wherein a particular form of the invention is illustrated by way of example. These drawings are described in the following specification and claims emphasize the scope of the invention.

In the drawings.

Similar reference numerals refer to similar parts throughout the drawings.

Figure 1:
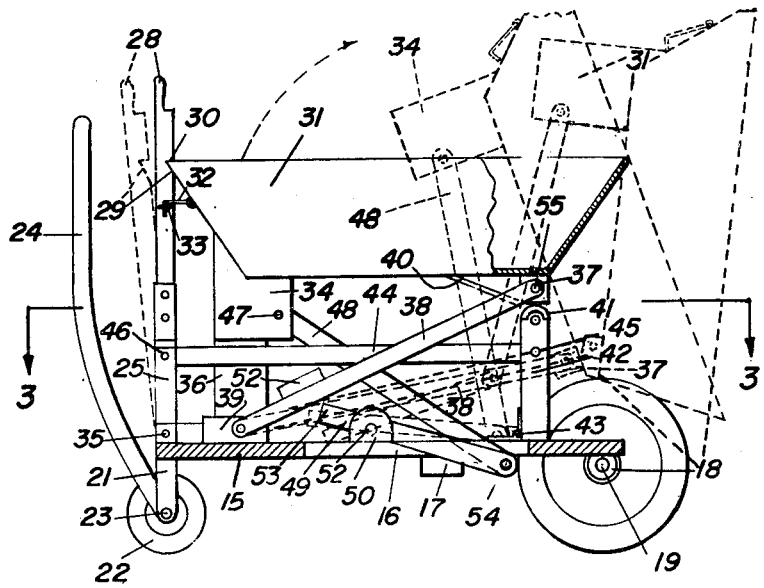
Figure 1 is a side elevation of the self-dumping apparatus embodying this invention and is shown with parts broken away to show its inner construction, and is shown in full lines in its transporting and loading position, and in dotted lines to show the position of the body when it is in the dumping position.
Figure 2:
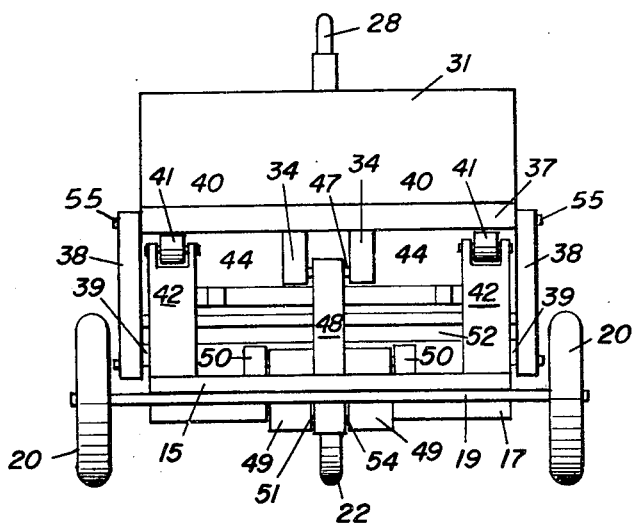
Figure 2 is a front view of Figure 1.
Figure 3:
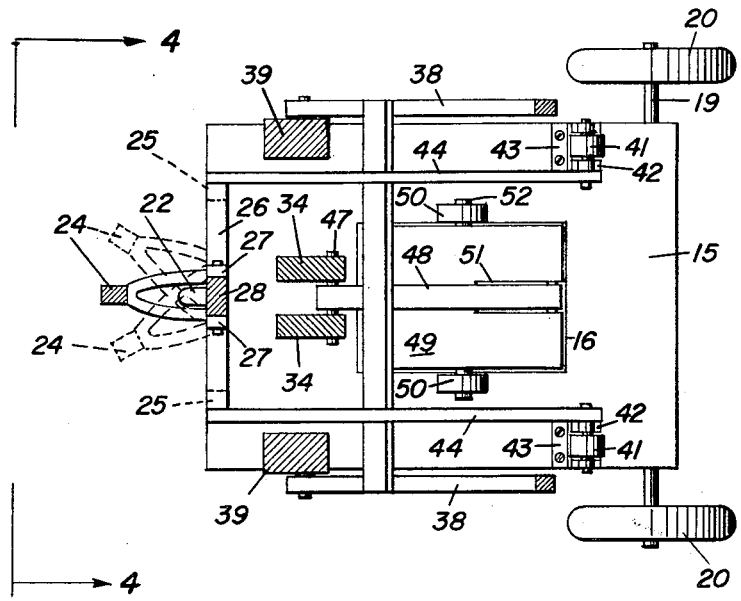
Figure 3 is a sectional view taken along lines 3—3 of Figure 1.
Figure 4:
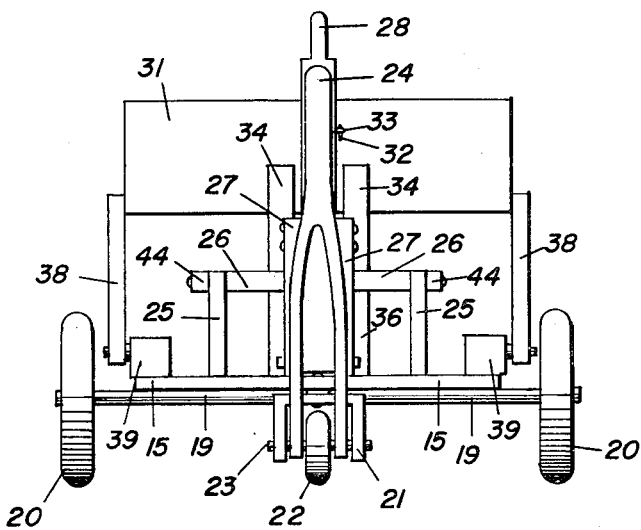
Figure 4 is an end view looking in the direction of arrows 4—4 shown in Figure 3.

In the particular form of the invention illustrated, a base 15 is provided with a cut-out portion 16 and a stop 17 to be described latter. The front end of the base is provided with bearings 18 to receive an axle 19 to which are secured a pair of wheels 20. The rear end of the base is provided with a yoke 21 pivotally connected thereto and acting as a support for a smaller wheel 22 which is mounted on an axle 23. A single tongue handle 24 is preferably attached to the axle 23 and yoke 21 and is used to guide and push the apparatus over the ground. Risers 25 are pivotally attached to the base at 35, project upwardly to join a cross member 26 having uprights 27 to support a handle 28. A latch handle 28 has a cut-out portion 29 to engage and hold the edge 30 of a dump body 31 and is normally kept in engagement therewith by a hook 32 and screw eye 33. The rear end of the body 31 is provided with a pair of bearing plates 34 which normally rest on a stand 36. The front end of the body 31 has a cross-member 37 pivotally connected with the upper end of the main support arms 38, while the lower end of the arms 38 are pivotally connected to fixed pivot members 39 fastened to the base 15. Deflector plates 40 attached to the lower ends of the cross-member 37 guide the rollers 41 and pivot arms 42 as they are moved back on their hinges 43 attached to the base 15. The arms 42 are pulled out of engagement with the cross member 37, by connections 44 attached to the pivot arms 42 by pins 45 and connected to the risers 25 by pins 46. A pin 47 positioned between the bearing plates 34 supports the dumping arm 48 at its upper end, and the lower end of the arm 48 is pivotally attached to striking arm 49. The striking arm 49 is supported between bearings 50 and is provided with a slot 51 to enable the lower end of the dumping arm 48 to be connected thereto by a pin 56. A cross arm 52 connects the main support arms 38 and presses down on the end 53 of the striking arm 49 when the body 31 is lowered.

In the operation of the self-dumping apparatus the hook and eye 32 and 33 are fastened to keep the cut-out 29 engaged with the edge 30 of the body 31. The body is then loaded with the material to be transported, and the operator pushes on the tongue handle 24 and at the same time turns the wheel 22 to guide the load to its destination. The hook and eye 32 and 33 are then disengaged and the handle 28 pulled out so the cut-out will be disengaged from the rim 30 of the body 31 and the connections 44 then pull the pivot arms 42 away from supporting the end 55, causing it and the main support arms 38 to drop. During this movement the dumping arm 48 will swing in an arc upward with the pin 54 as the center point and pin 47 traveling on the circumference of the arc. When the main support arms 38 reach their lowest point, the cross arm 52 strikes the end 53 of the arm 49 and raises the dumping arm 48 still further, to cause the body 31 to travel more than ninety degrees and make a complete dump.

While but one general form of the invention is shown in the drawings and described in the specification, it is not desired to limit this application for patent to this particular form as it is appreciated that other forms could be made that would use the same principles and come within the scope of the appended claims.

Having thus described the invention, what is claimed is:

1. In a self-dumping apparatus of the class described comprising in combination, a base, wheels attached to the front of said base, a single rear wheel pivotally connected to the rear of said base for guiding the apparatus during its travels, a tongue handle attached to said rear wheel for manipulating the apparatus over the terrain, pivot arms hingedly attached to the base and extending upwardly towards the front end of the body, a stand located on said base, bearing plates at the rear of the body resting on the stand, a body attached to said bearing plates, risers at the rear of the apparatus pivotally connected to said base, connections pivotally connected between said risers and pivot arms, a fixed pivot member attached near the rear of said base, a cross member attached to the front of said body engaging the aforesaid pivot arms, main support arms connected between said cross member and the fixed pivot member, a striking arm pivotally mounted on said base and extending to the rear of the body, a dumping arm pivotally attached to said striking arm and the bearing plates to tilt the body upwardy at the rear when the pivot arms are tilted rearward.

2. A self-dumping apparatus as set forth in claim 1 including an arm pivoted to the risers and latching means between said arm and the body.

3. A self-dumping apparatus as set forth in claim 2 further including a cross arm transversely connecting the main support arms to contact the end of the striking arm and raise the edge of the body over ninety degrees.

References Cited in the file of this patent

UNITED STATES PATENTS

| 1,264,432 | Palm | Apr. 30, 1918 |
| 1,481,002 | Ferris | Jan. 15, 1924 |
| 2,530,574 | Getman | Nov. 21, 1950 |